June 3, 1930.  A. McMILLAN  1,761,737
STATION INDICATOR
Filed Jan. 17, 1929
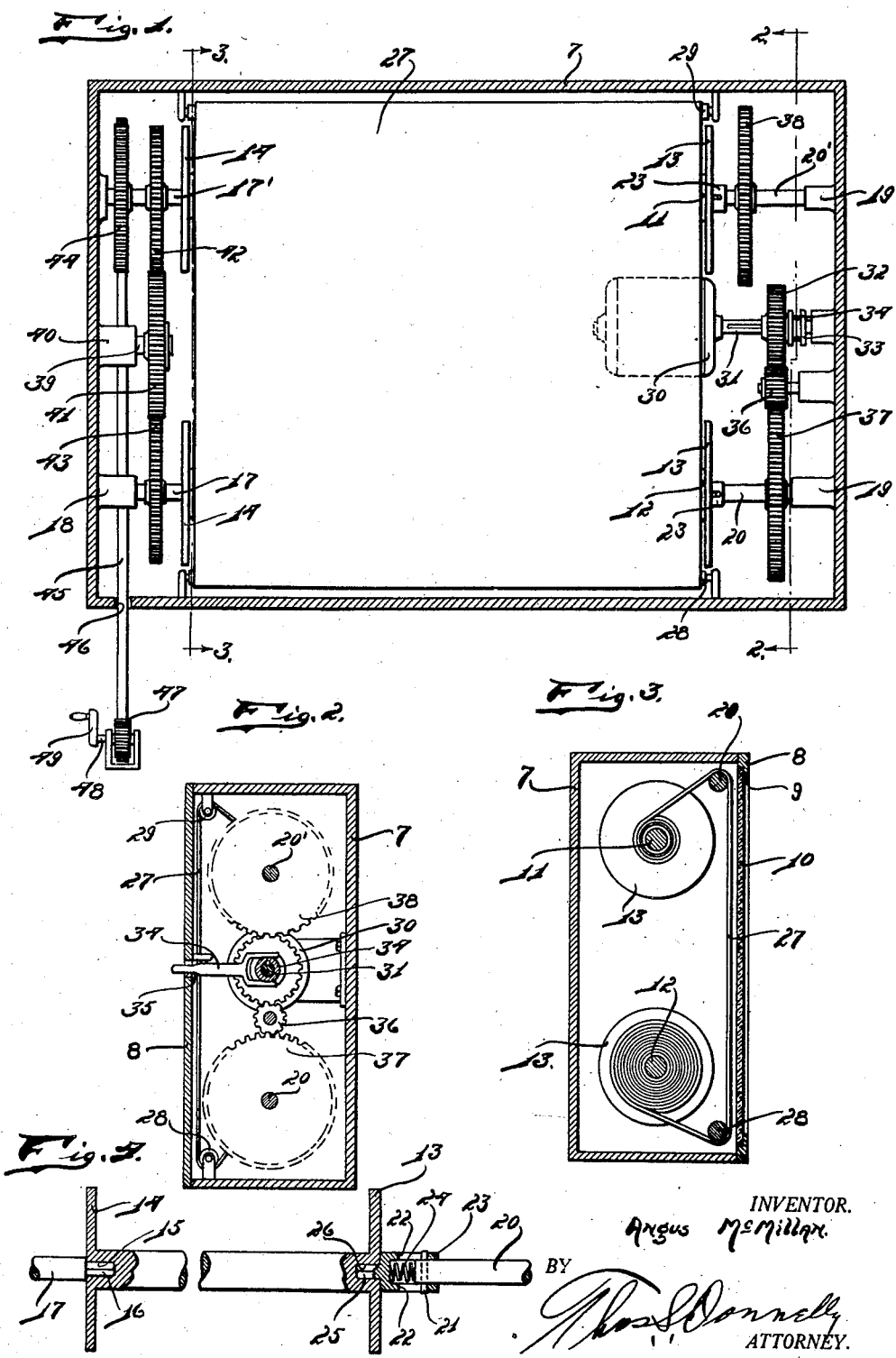
INVENTOR.
Angus McMillan
BY
Thos. Donnelly
ATTORNEY.

Patented June 3, 1930

1,761,737

UNITED STATES PATENT OFFICE

ANGUS McMILLAN, OF WINDSOR, ONTARIO, CANADA

STATION INDICATOR

Application filed January 17, 1929. Serial No. 333,126.

My invention relates to a new and useful improvement in a station indicator adapted for use in indicating the stations or stops of a public vehicle such as street cars, trains and the like. The device may also be used for advertising purposes as well as a station indicator.

It is an object of the present invention to provide a device of this class which will be simple in structure, economical of manufacture and highly efficient in use.

Another object of the invention is the provision of power driven means for causing the flexible display member to wind and unwind on spools.

Another object of the invention is means for making the power driven means to rapidly wind the flexible display member on one of the spools.

Other objects will appear hereinafter.

The invention consists in the combination and arrangement of parts hereinafter described and claimed.

The invention will be best understood from a reference to the accompanying drawing which forms a part of this specification, and in which, Fig. 1 is a sectional view of the invention.
Fig. 2 is a view taken on line 2—2 of Fig. 1.
Fig. 3 is a view taken on line 3—3 of Fig. 1.
Fig. 4 is a fragmentary side elevational view of one of the spools with parts broken away and parts shown in section.

In the drawings, I have illustrated the device inclosed in a housing 7 which may be mounted in a public vehicle in any desired place so that the front wall 8 which is provided with the opening 9 closed by the transparent closure 10, may be visible to the occupants of the vehicle. The mounting of the various spools is the same and a description of one will suffice for both. A pair of spools 11 and 12 are used in the invention, each of these spools having an end flange 13 and 14. Formed in one end of the spools is a socket 15 in which engages the squared end 16 of a shaft 17, this shaft 17 being suitably journaled in a bearing 18 mounted in the housing. Journaled in a bearing 19 and projecting inwardly from the wall of the housing is a shaft 20 having a pin 21 which projects diametrically therefrom and engages in the slots 22 formed in the sleeve 23 in which is positioned a spring 24. A squared end 25 projects from the end of the sleeve 23 and engages in a socket 26 formed in the end of the spool. This method of mounting permits easy and quick removal of the spool from position and an axial movement of the sleeve 23 against the pressure of the spring 24 permitting disengagement of the squared end 16 from the socket 15.

Wound upon these spools is a flexible member 27 on which the stations are displayed or on which advertising matter and similar printed matter may be displayed. This member 27 passes around idlers 28 and 29 so as to retain the member 27 in position behind the transparent closure 10. An electric motor 30 connected to a suitable source of electrical energy is provided with a shaft 31 on which is positioned a gear wheel 32. The gear wheel 32 rotates in unison with the shaft 31 but is axially movable thereon. A collar 33 is carried by the wheel 32 and engaged by the arms of a rockably mounted yoke 34 which projects through the opening 35 formed in the housing so that the gear 32 may be moved into mesh with the pinion 36 which meshes with a gear 37 fixedly mounted on the shaft 20, or the gear 32 may be moved into position for meshing with the gear 38 which is fixedly mounted on the shaft 20', this shaft 20' corresponding to the shaft 20.

Fixedly mounted on the shaft 39 which extends inwardly from the bearing 40 is a gear 41 meshing with a gear 42 fixedly mounted on the shaft 17' which corresponds to the shaft 17 described. A gear 43 is fixedly mounted on the shaft 17 and meshes with the gear 41. Fixedly mounted on the shaft 17' is a gear 44 connected by a chain 45 which projects through the opening 46 formed in the housing 7 to a gear 47 which may be mounted in any convenient place so that the shaft 48 on which the gear 47 is fixedly mounted may be rotated by the detachable crank 49.

In use, the motor 30 may be timed to correspond to the running speed of the vehicle so that the flexible display member 27 will travel between the transparent closure 10 so as to display the matter printed thereon at proper times, or, if desired, the motor 30 may be provided with switches so that the flexible member 27 may be caused to travel to its various positions at the desired times, depending upon the judgment of the operator.

When the gear 32 is moved into mesh with the gear 38 a rapid rewinding of the flexible member 27 on the spool 11 will be effected.

Should, for any reason, the motor 30 become inoperative, the crank 49 may be used for rotating these spools to desired positions.

While I have illustrated and described the preferred form of my invention, I do not wish to limit myself to the precise detail of structure shown, but desire to avail myself of such variations and modifications as come within the scope of the appended claim.

Having thus described my invention, what I claim as new and desire to secure by Letters Patent is:

In a device of the class described a housing having end walls; a bearing mounted in each of said end walls; a shaft projecting inwardly from each of said bearings; a sleeve slidably mounted on one end of one of said shafts, said sleeve having elongated longitudinally oppositely positioned slots formed therein; a spring positioned in said sleeve and normally resisting slidable movement of the same on its shaft; a pin projected through said shaft and engaging in said slots; a reduced portion on the end of said sleeve; a reduced portion on the end of the other shaft; and a spool having a socket formed in opposite ends for reception of said reduced portions, the slidable movement of said sleeve on its shaft effecting a disengagement of its reduced portion from said socket.

In testimony whereof I have signed the foregoing specification.

ANGUS McMILLAN.